3,071,603
3β-FLUORO-Δ⁵-9β,10α-PREGNEN-20-ONE
AND DERIVATIVES THEREOF
John A. Zderic, Palo Alto, Calif., and Otto Halpern and Jose Iriarte, Mexico City, Mexico, assignors, by mesne assignments, to Syntex Corporation, a corporation of Panama
No Drawing. Filed Jan. 31, 1962, Ser. No. 170,268
19 Claims. (Cl. 260—397.3)

The present invention relates to novel cyclopentanophenanthrene derivatives and to a process for the production thereof.

More particularly the present invention relates to novel 3β-halo-Δ⁵-9β,10α-pregnen-20-one compounds, the 17α-hydroxy derivatives thereof, the 21-hydroxy or fluoro derivatives of the 17α-desoxy and 17α-hydroxy compounds and esters of the said hydroxy compounds.

The novel compounds of the present invention which are potent progestational agents possessing anti-estrogenic, anti-gonadotrophic and anti-ovulatory properties are represented by the following formula:

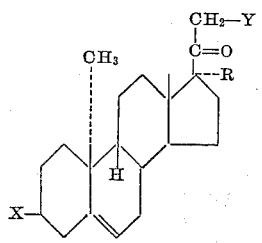

In the above formula X represents fluorine, chlorine or bromine; Y may be hydrogen, fluorine, hydroxy or an acyloxy group; and R represents hydrogen, hydroxy or an acyloxy group.

The acyloxy groups are derived from hydrocarbon carboxylic acids containing less than 12 carbon atoms which may be saturated or unsaturated, of straight, branched, cyclic or cyclic-aliphatic chain, aromatic, and may be substituted by functional groups, such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process partially represented by the following formula scheme:

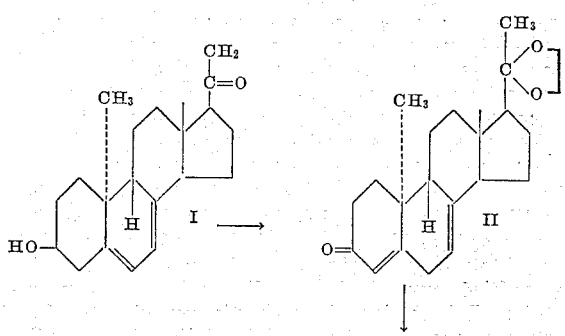

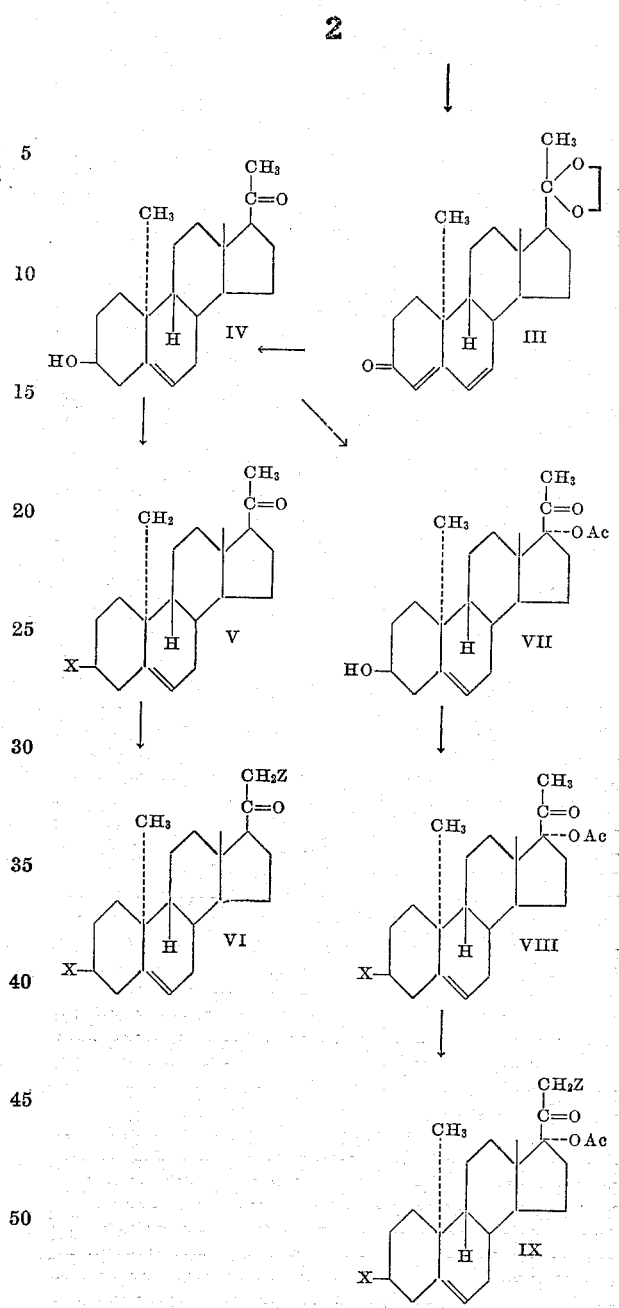

In the above formulas X has the hereinbefore described meaning, Ac represents the acetyl group and Z represents iodine, fluorine or acetoxy.

In practicing the process outlined above, the starting Δ⁵,⁷-9β,10α-pregnadien-3β-ol-20-one (I) is conventionally treated with ethylene glycol in the presence of an acid, to give 20-cycloethylenedioxy-Δ⁵,⁷-9β,10α-pregnadien-3β-ol. Oppenauer oxidation of the latter compound affords 20-cycloethylenedioxy - Δ⁴,⁷ - 9β,10α-pregnadien-3-one (II). The Δ⁷-double bond of this derivative is shifted to the Δ⁶-conjugated position by treatment in a basic medium, to give the corresponding $\Delta^{4,6}$-derivative (III). Reduction of the latter compound with an alkali metal, preferably lithium, in liquid ammonia, yields 20-cycloethylenedioxy-$\Delta^5$-9β,10α-pregnen-3β-ol which upon conventional treatment in a mild acid medium affords $\Delta^5$-9β,10α-pregnen-3β-ol-20-one (IV). The latter compound upon treatment with a suitable halogenating agent such as hydrogen fluoride, phosphorus pentachloride or phosphorus pentabromide, in a solvent inert to the corresponding reagent, yields respectively the 3β-fluoro, 3β-chloro or 3β-bromo $\Delta^5$-9β,10α-pregnen-20-one (V). Treatment of a 3-halo derivative selected from the latter group with calcium oxide and iodine, in a suitable solvent such as methanol and tetrahydrofuran yields the corresponding 3β-halo-21-iodo-$\Delta^5$-9β,10α-pregnen-20-one (VI: Z=iodo) which is alternately converted into the corresponding 21-fluoro derivative (VI: Z=fluoro) by treatment with a metal fluoride, preferably silver fluoride, and into the corresponding 21-acetoxy derivative (VI: Z=acetoxy) by reaction with an alkali metal acetate such as potassium acetate.

Following a second series of reactions $\Delta^5$-9β,10α-pregnen-3β-ol-20-one (IV) is submitted to the Gallagher treatment, i.e. the said compound is treated with acetic anhydride in the presence of p-toluenesulfonic acid to give 3β,20-diacetoxy-$\Delta^{5,17(20)}$-9β,10α-pregnadiene, which upon reaction with 2.2 molar equivalents of an organic peracid, preferably perbenzoic acid, in an inert solvent such as benzene, yields a mixture of 3β,20 - diacetoxy - 5α,6α; 17α,20α-bis-oxido-9β,10α-pregnane and the 5β,6β-oxido isomer thereof; this mixture upon reaction in a mild basic medium gives a mixture consisting of 5α,6α-oxido-9β,10α-pregnane-3β,17α-diol-20-one and the 5β,6β-oxido isomer thereof which upon treatment under Cornforth conditions, i.e. with sodium iodide, sodium acetate and zinc dust, in acetic acid, for a period of time of the order of 6 hours, yields $\Delta^5$-9β,10α-pregnene-3β,17α-diol-20-one. Conventional acetylation of this compound with acetic anhydride in the presence of p-toluenesulfonic acid, followed by selective saponification of the 3β-acetoxy group of the resulting 3,17-diacetate, furnishes $\Delta^5$-9β,10α-pregnene - 3β,17α - diol-20-one-17-acetate (VII). The latter compound is treated with a suitable halogenating agent such as hydrogen fluoride, phosphorus pentachloride or phosphorus pentabromide, in a solvent inert to the used reagent, to yield the respective 3β-fluoro, 3β-chloro or 3β-bromo - 17α-acetoxy-$\Delta^5$-9β,10α-pregnen-20-one (VIII). Treatment of one of these 3β-halo compounds with calcium oxide and iodine, in a suitable solvent, preferably methanol and tetrahydrofuran, furnishes the corresponding 3β-halo-21-iodo - 17α - acetoxy-$\Delta^5$-9β,10α-pregnen-20-one (IX: Z=iodo). The latter compound is alternately transformed into the corresponding 21-fluoro derivative (IX: Z=fluoro) by reaction with a metal fluoride, preferably silver fluoride, and into the corresponding 21-acetoxy derivative (IX: Z=acetoxy) by treatment with an alkali metal acetate such as potassium acetate.

The compounds obtained by the heretofore described process having a 17α- and/or 21-acetoxy group present in the molecule, upon conventional saponification in a basic medium, yield the corresponding 17α- and/or 21-free hydroxy compounds. The 17α- and 21-hydroxyl groups of the latter compounds are conventionally re-esterified in the presence of p-toluenesulfonic acid with an acylating agent, such as an anhydride derived from a hydrocarbon carboxylic acid of the type hereinbefore defined.

Selective esterification of the 21-hydroxyl group takes place when the operation is conventionally conducted in pyridine and in the absence of p-toluenesulfonic acid.

The following specific examples serve to illustrate, but should not be construed as a limitation to, the present invention.

Example I

A mixture of 5 g. of $\Delta^{5,7}$-9β,10α-pregnadien-3β-ol-20-one [Rappoldt et al., Rec. Trav. Chim., 80, 43 (1961)], 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 20-cycloethylenedioxy-$\Delta^{5,7}$-9β,10α-pregnadien-3β-ol.

Example II

A solution of 4 g. of the latter steroid in 280 cc. of toluene and 80 cc. of cyclohexanone was dried by distilling off 10 cc. of the solvent. A solution of 4 g. of aluminum isopropoxide dissolved in 28 cc. of anhydrous toluene was then added and the mixture was refluxed for 45 minutes; 12 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 20-cycloethylenedioxy-$\Delta^{4,7}$-9β,10α-pregnadien-3-one.

Example III

A solution of 0.17 g. of potassium hydroxide in 0.2 cc. of water and 2.5 cc. of methanol was added over 30 minutes to a boiling solution of 4 g. of the above compound in 130 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 20-cycloethylenedioxy-$\Delta^{4,6}$-9β,10α-pregnadien-3-one.

Example IV

A solution of 3 g. of the above compound in 60 cc. of dioxane-ether (1:1) was added in a steady stream to a solution of 0.6 g. of lithium in 800 cc. of anhydrous liquid ammonia with good stirring. At the end of the addition the blue color was discharged by the addition of 15 g. of ammonium chloride and the ammonia was allowed to evaporate. The product was extracted with ether, washed with water, dried and the ether evaporated to afford a gum which was adsorbed from 300 cc. of benzene onto 150 g. of alumina. Elution with benzene-ether afforded a product which upon recrystallization from acetone-hexane gave 20-cycloethylenedioxy-$\Delta^5$-9β,10α-pregnen-3β-ol.

Example V 3 g. of the above compound were dissolved in 150 cc. of acetone and treated with 250 mg. of p-toluenesulfonic acid, the reaction mixture was kept at room temperature overnight. It was then poured into ice water, extracted with ethyl acetate and the organic extract washed with water to neutral, dried and evaporated to dryness. Addition of ether gave $\Delta^5$-9β,10α-pregnen-3β-ol-20-one.

Example VI

In a polyethylene flask, adapted with magnetic stirrer, there were dissolved 2.8 g. of the foregoing compound in 30 cc. of methylene chloride, the solution was cooled to 0° C. and a solution of 12 g. of anhydrous hydrogen fluoride in 20 cc. of tetrahydrofuran cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 3β-fluoro-Δ⁵-9β,10α-pregnen-20-one.

Example VII

To a solution of 5 g. of Δ⁵-9β,10α-pregnen-3β-ol-20-one, in 100 cc. of benzene were added 5 g. of phosphorus pentachloride and the resulting mixture was refluxed for 1 hour in the absence of moisture. It was then cooled, poured into water; the benzene layer was washed with water several times, dried over anhydrous sodium sulfate and evaporated to dryness. Crystallization of the residue from acetone-hexane yielded 3β-chloro-Δ⁵-9β,10α-pregnen-20-one.

Example VIII

Following the procedure described in the foregoing example, except that phosphorus pentachloride was substituted by phosphorus pentabromide, there was obtained 3β-bromo-Δ⁵-9β,10α-pregnen-20-one.

Example IX

A mixture of 6.6 g. of Δ⁵-9β,10α-pregnen-3β-ol-20-one, 2.7 g. of p-toluenesulfonic acid and 300 cc. of acetic anhydride was submitted to a slow distillation; during 5 hours. The residue was cooled and poured into iced water. The product was then extracted with ether, the extract washed successively with an aqueous solution of sodium carbonate and water to neutral, dried and evaporated to dryness. The residue consisted of 3β,20-diacetoxy-Δ⁵,¹⁷⁽²⁰⁾-9β,10α-pregnadiene which was utilized in the following step without purification.

6 g. of this crude product were treated with 480 cc. of a 1.2 molar solution of perbenzoic acid in benzene (2.2 molar equivalents), at room temperature and in the dark, for 20 hours. Water was then added, the organic layer separated, washed with an aqueous solution of sodium bicarbonate, then with water, dried with anhydrous sodium sulfate and evaporated to dryness. The residue consisted of a mixture of 3β-20-diacetoxy, 5α,6α; 17α,20α-bis-oxido-9β,10α-pregnane and the 5β,6β-oxido isomer thereof.

This crude mixture was treated with 500 cc. of a 1% methanolic solution of potassium hydroxide at room temperature for 1 hour, the mixture was neutralized by addition of acetic acid, concentrated to small volume under reduced pressure, the product was precipitated by addition of ice water, filtered off, washed with water, and dried thus giving a mixture of 5α,6α-oxido-9β,10α-pregnane-3β,17α-diol-20-one and the 5β,6β-oxido isomer thereof.

To 5 g. of the above mixture in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded Δ⁵-9β,10α-pregnene-3β,17α-diol-20-one.

To a solution of 4.5 g. of the foregoing compound in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced Δ⁵-9β,10α-pregnene-3β,17α-diol-20-one-3,17-diacetate.

2 g. of the foregoing diacetate was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing Δ⁵-9β,10α-pregnene-3β,17α-diol-20-one-17-acetate.

Example X

The foregoing compound was treated following the procedure described in Example VI, thus yielding 3β-fluoro-17α-acetoxy-Δ⁵-9β,10α-pregnen-20-one.

Example XI

Δ⁵-9β,10α-pregnene-3β,17α-diol-20-one-17-acetate was treated in accordance with Example VII, thus furnishing 3β-chloro-17α-acetoxy-Δ⁵-9β,10α-pregnen-20-one.

Example XII

Upon treatment of Δ⁵-9β,10α-pregnene-3β,17α-diol-20-one-17-acetate by the procedure described in Example VIII there was obtained 3β-bromo-17α-acetoxy-Δ⁵-9β,10α-pregnen-20-one.

Example XIII

A cooled solution of 4 g. of 3β-fluoro-Δ⁵-9β,10α-pregnen-20-one in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 3β-fluoro-21-iodo-Δ⁵-9β,10α-pregnen-20-one.

The foregoing crude compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydride sodium sulfate and concentrated until crystallization started. The precipitate was collected and crystallized from methanol-water, thus yielding 3β-fluoro-Δ⁵-9β,10α-pregnen-21-ol-20-one-acetate.

Example XIV

3β-chloro-Δ⁵-9β,10α-pregnen-20-one was treated by the procedure described in the foregoing example, thus affording consecutively 3β-chloro-21-iodo-Δ⁵-9β,10α-pregnen-20-one and 3β-chloro-Δ⁵-9β,10α-pregnen-21-ol-20-one acetate.

Example XV

3β-bromo-Δ⁵-9β,10α-pregnen-20-one was treated in accordance with Example XIII, yielding successively 3β-bromo-21-iodo-Δ⁵-9β,10α-pregnen-20-one and 3β-bromo-Δ⁵-9β,10α-pregnen-21-ol-20-one-acetate.

Example XVI

Following the procedures described in Example XIII, there was treated 3β-fluoro-17α-acetoxy-Δ⁵-9β,10α-pregnen-20-one, thus furnishing consecutively 3β-fluoro-21-iodo-17α-acetoxy-Δ⁵-9β,10α-pregnen-20-one and 3β-fluoro-17α,21-diacetoxy-Δ⁵-9β,10α-pregnen-20-one.

Example XVII

When applying the methods described in Example XIII to 3β-chloro-17α-acetoxy-Δ⁵-9β,10α-pregnen-20-one, there were successively obtained 3β-chloro-21-iodo-17α-acetoxy-Δ⁵-9β,10α-pregnen-20-one, and 3β-chloro-17α,21-diacetoxy-Δ⁵-9β,10α-pregnen-20-one.

Example XVIII

3β-bromo-17α-acetoxy-Δ⁵-9β,10α-pregnen-20-one was treated in accordance with the procedures described in Example XIII, thus affording consecutively 3β-bromo- 21-iodo-17α-acetoxy-Δ⁵-9β,10α-pregnen-20-one and 3β-bromo-17α,21-diacetoxy-Δ⁵-9β,10α-pregnen-20-one.

*Example XIX*

3 g. of 3β-fluoro-21-iodo-Δ⁵-9β,10α-pregnen-20-one were dissolved in 20 cc. of acetonitrile and treated dropwise with 1.1 molar equivalents of silver fluoride dissolved in 3 cc. of water. After a short time, silver iodide started to separate leaving the 21-fluoro-pregnan derivative in solution. The mixture was kept for 24 hours at room temperature and filtered. Concentration of the filtrate under vacuum gave a crude product which after crystallization from methanol-acetone yielded 3β,21-difluoro-Δ⁵-9β,10α-pregnen-20-one.

When applying the foregoing procedure to the starting compounds under I, there were obtained the corresponding products under II.

| I | II |
|---|---|
| 3β-chloro-21-iodo-Δ⁵-9β, 10α-pregnen-20-one. | 3β-chloro-21-fluoro-Δ⁵-9β, 10α-pregnen-20-one. |
| 3β-bromo-21-iodo-Δ⁵-9β, 10α-pregnen-20-one. | 3β-bromo-21-fluoro-Δ⁵-9β, 10α-pregnen-20-one. |
| 3β-fluoro-21-iodo-17α-acetoxy-Δ⁵-9β, 10α-pregnen-20-one. | 3β,21-difluoro-17α-acetoxy-Δ⁵-9β, 10α-pregnen-20-one. |
| 3β-chloro-21-iodo-17α-acetoxy-Δ⁵-9β, 10α-pregnen-20-one. | 3β-chloro-21-fluoro-17α-acetoxy-Δ⁵-9β, 10α-pregnen-20-one. |
| 3β-bromo-21-iodo-17α-acetoxy-Δ⁵-9β, 10α-pregnen-20-one. | 3β-bromo-21-fluoro-17α-acetoxy-Δ⁵-9β, 10α-pregnen-20-one. |

*Example XX*

A solution of 0.17 g. of potassium hydroxide in 0.2 cc. of water and 2.5 cc. of methanol was added over 30 minutes to a boiling solution of 1 g. of 3β-fluoro-17α-acetoxy-Δ⁵-9β,10α-pregnen-20-one in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 3β-fluoro-Δ⁵-9β,10α-pregnen-17α-ol-20-one.

The starting compounds listed under I were treated following the above technique, thus yielding the corresponding products under II.

| I | II |
|---|---|
| 3β-chloro-17α-acetoxy-Δ⁵-9β, 10α-pregnen-20-one. | 3β-chloro-Δ⁵-9β, 10α-pregnen-17α-ol-20-one. |
| 3β-bromo-17α-acetoxy-Δ⁵-9β, 10α-pregnen-20-one. | 3β-bromo-Δ⁵-9β, 10α-pregnen-17α-ol-20-one. |
| 3β-fluoro-21-acetoxy-Δ⁵-9β, 10α-pregnen-20-one. | 3β-fluoro-Δ⁵-9β, 10α-pregnen-21-ol-20-one. |
| 3β-chloro-21-acetoxy-Δ⁵-9β, 10α-pregnen-20-one. | 3β-chloro-Δ⁵-9β, 10α-pregnen-21-ol-20-one. |
| 3β-bromo-21-acetoxy-Δ⁵-9β, 10α-pregnen-20-one. | 3β-bromo-Δ⁵-9β, 10α-pregnen-21-ol-20-one. |
| 3β,21-difluoro-17α-acetoxy-Δ⁵-9β, 10α-pregnen-20-one. | 3β,21-difluoro-Δ⁵9β, 10α-pregnen-17α-ol-20-one. |
| 3β-chloro-21-fluoro-17α-acetoxy-Δ⁵-9β, 10α-pregnen-20-one. | 3β-chloro-21-fluoro-Δ⁵-9β, 10α-pregnen-17α-ol-20-one. |
| 3β-bromo-21-fluoro-17α-acetoxy-Δ⁵-9β, 10α-pregnen-20-one. | 3β-bromo-21-fluoro-Δ⁵-9β, 10α-pregnen-17α-ol-20-one. |
| 3β-fluoro-17α, 21-diacetoxy-Δ⁵-9β, 10α-pregnen-20-one. | 3β-fluoro-Δ⁵-9β, 10α-pregnen-17α, 21-diol-20-one. |
| 3β-chloro-17α, 21-diacetoxy-Δ⁵-9β, 10α-pregnen-20-one. | 3β-chloro-Δ⁵-9β, 10α-pregnen-17α, 21-diol-20-one. |
| 3β-bromo-17α, 21-diacetoxy-Δ⁵-9β, 10α-pregnen-20-one. | 3β-bromo-Δ⁵-9β, 10α-pregnen-17α, 21-diol-20-one. |

*Example XXI*

To a solution of 5 g. of 3β-fluoro-Δ⁵-9β,10α-pregnen-17α-ol-20-one in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the propionate of 3β-fluoro-Δ⁵-9β,10α-pregnen-17α-ol-20-one.

When applying the above procedure to the starting compounds under I there were obtained the products under II.

| I | II |
|---|---|
| 3β-chloro-Δ⁵-9β, 10α-pregnen-17α-ol-20-one. | 17-propionate of 3β-chloro-Δ⁵-9β, 10α-pregnen-17α-ol-20-one. |
| 3β-bromo-Δ⁵-9β, 10α-pregnen-17α-ol-20-one. | 17-propionate of 3β-bromo-Δ⁵-9β, 10α-pregnen-17α-ol-20-one. |
| 3β,21-difluoro-Δ⁵-9β,10α-pregnen-17α-ol-20-one. | 17-propionate of 3β,21-difluoro-Δ⁵-9β, 10α-pregnen-17α-ol-20-one. |
| 3β-chloro-21-fluoro-Δ⁵-9β, 10α-pregnen-17α-ol-20-one. | 17-propionate of 3β-chloro-21-fluoro-Δ⁵-9β, 10α-pregnen-17α-ol-20-one. |
| 3β-bromo-21-fluoro-Δ⁵-9β, 10α-pregnen-17α-ol-20-one. | 17-propionate of 3β-bromo-21-fluoro-Δ⁵-9β, 10α-pregnen-17α-ol-20-one |
| 3β-fluoro-Δ⁵-9β, 10α-pregnen-17α, 21-diol-20-one. | 17, 21-dipropionate of 3β-fluoro-Δ⁵-9β, 10α-pregnen-17α, 21-diol-20-one. |
| 3β-chloro-Δ⁵-9β, 10α-pregnen-17α, 21-diol-20-one. | 17, 21-dipropionate of 3β-chloro-Δ⁵-9β, 10α-pregnen-17β, 21-diol-20-one. |
| 3β-bromo-Δ⁵-9β, 10α-pregnen-17α, 21-diol-20-one. | 17, 21-dipropionate of 3β-bromo-Δ⁵-9β, 10α-pregnen-17α, 21-diol-20-one. |

*Example XXII*

The starting compounds of the foregoing example were treated following the procedure described in the same example, except that propionic anhydride was substituted by caproic anhydride and cyclopentylpropionic anhydride, thus affording the corresponding caproates and cyclopentylpropionates of the said compounds.

*Example XXIII*

A mixture of 1 g. of 3β-fluoro-Δ⁵-9β,10α-pregnen-21-ol-20-one, 4 cc. of pyridine and 2 cc. of propionic anhydride was kept at room temperature overnight, poured into ice water, the formed precipitate was filtered, washed with water and dried. Crystallization from acetone-hexane gave the 21-propionate of 3β-fluoro-Δ⁵-9β,10α-pregnen-21-ol-20-one.

The starting compounds under I were treated by the above procedure, yielding the products under II.

| I | II |
|---|---|
| 3β-chloro-Δ⁵-9β, 10α-pregnen-21-ol-20-one. | 21-propionate of 3β-chloro-Δ⁵-9β,10α-pregnen-21-ol-20-one. |
| 3β-bromo-Δ⁵-9β, 10α-pregnen-21-ol-20-one. | 21-propionate of 3β-bromo-Δ⁵-9β,10α-pregnen-21-ol-20-one. |
| 3β-fluoro-Δ⁵-9β, 10α-pregnen-17α, 21-diol-20-one. | 21-propionate of 3β-fluoro-Δ⁵-9β,10α-pregnen-17α, 21-diol-20-one. |
| 3β-chloro-Δ⁵-9β, 10α-pregnen-17α, 21-diol-20-one. | 21-propionate of 3β-chloro-Δ⁵-9β,10α-pregnen-17α, 21-diol-20-one. |
| 3β-bromo-Δ⁵-9β, 10α-pregnen-17α, 21-diol-20-one. | 21-propionate of 3β-bromo-Δ⁵-9β,10α-pregnen-17α, 21-diol-20-one. |

*Example XXIV*

The starting compounds of the foregoing example were treated in accordance with the procedure described in said example, with the exception that propionic anhydride was substituted by caproic anhydride and cyclopentylpropionic anhydride, thus affording the corresponding 21-caproates and 21-cyclopentylpropionates of the said compounds.

We claim:
1. A compound of the following formula:

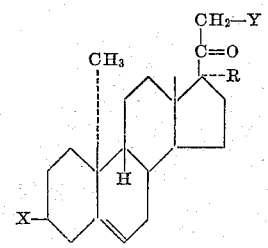

wherein X is selected from the group consisting of fluorine, chlorine and bromine; Y is a member of the group consisting of hydrogen, fluorine, hydroxyl and a hydrocarbon carboxylic acyloxy group of less than 12 carbon atoms and R is selected from the group consisting of hydrogen, hydroxyl and a hydrocarbon carboxylic acyloxy group of less than 12 carbon atoms.

2. 3β-fluoro-Δ⁵-9β,10α-pregnen-20-one.
3. 3β-chloro-Δ⁵-9β,10α-pregnen-20-one.
4. 3β-bromo-Δ⁵-9β,10α-pregnen-20-one.
5. 3β,21-difluoro-Δ⁵-9β,10α-pregnen-20-one.
6. 3β-chloro-21-fluoro-Δ⁵-9β,10α-pregnen-20-one.
7. 3β-bromo-21-fluoro-Δ⁵-9β,10α-pregnen-20-one.
8. 3β-fluoro-17α-acetoxy-Δ⁵-9β,10α-pregnen-20-one.
9. 3β-chloro-17α-acetoxy-Δ⁵-9β,10α-pregnen-20-one.
10. 3β-bromo-17α-acetoxy-Δ⁵-9β,10α-pregnen-20-one.
11. 3β,21-difluoro-17α-acetoxy-Δ⁵-9β,10α-pregnen-20-one.
12. 3β-chloro-21-fluoro-17α-acetoxy-Δ⁵-9β,10α-pregnen-20-one.
13. 3β-bromo-21-fluoro-17α-acetoxy-Δ⁵-9β,10α-pregnen-20-one.
14. 3β-fluoro-Δ⁵-9β,10α-pregnen-21-ol-20-one.
15. 3β-chloro-Δ⁵-9β,10α-pregnen-21-ol-20-one.
16. 3β-bromo-Δ⁵-9β,10α-pregnen-21-ol-20-one.
17. 3β-fluoro-Δ⁵-9β,10α-pregnene-17α,21-diol-20-one.
18. 3β-chloro-Δ⁵-9β,10α-pregnene-17α,21-diol-20-one.
19. 3β-bromo-Δ⁵-9β,10α-pregnene-17α,21-diol-20-one.

No references cited.